Dec. 22, 1964          D. D. MURPHY                3,162,298
                         CONVEYOR
                    Filed March 30, 1962
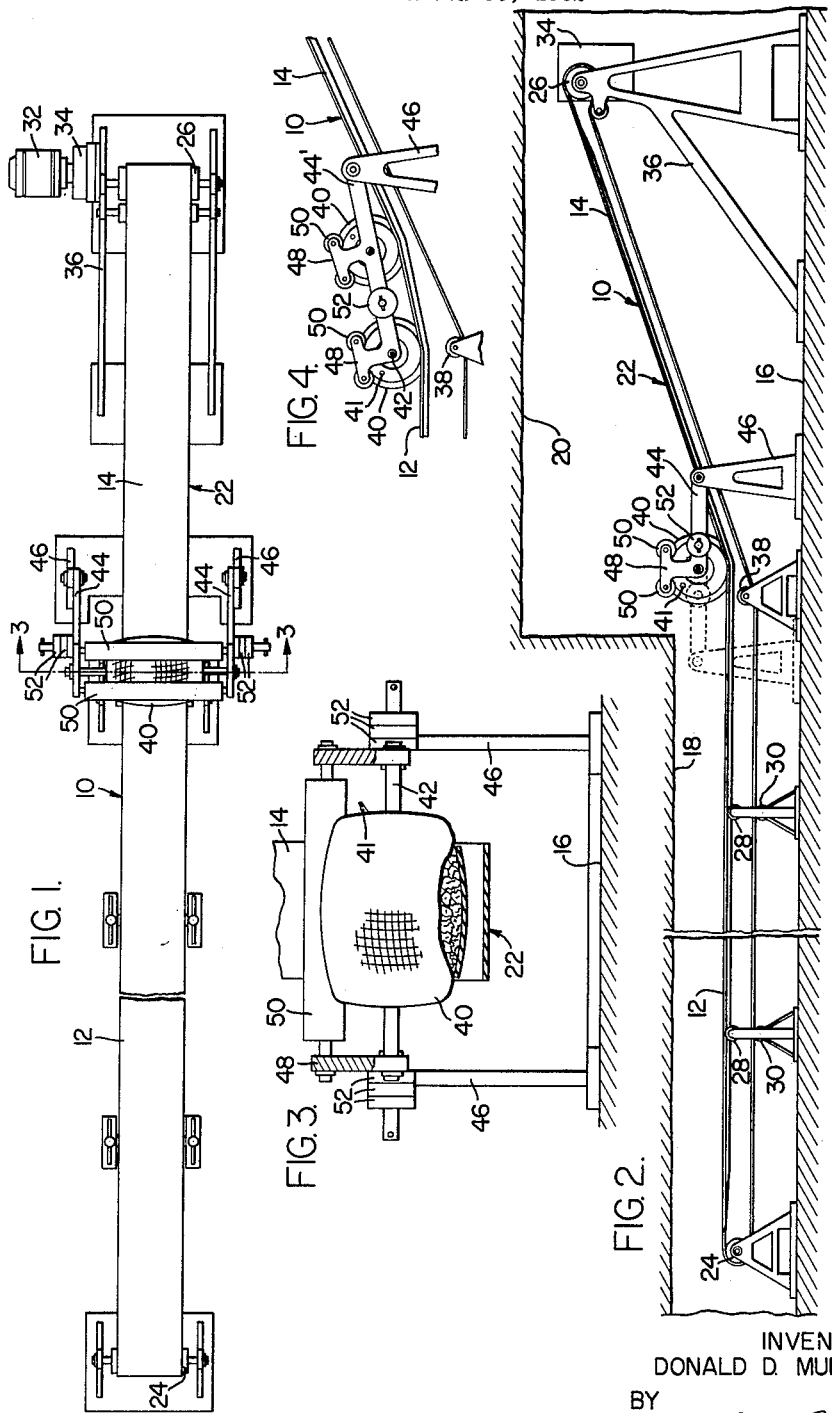
INVENTOR:
DONALD D. MURPHY
BY
E. Wallace Brewster
ATTORNEY 3,162,298
CONVEYOR
Donald Duane Murphy, Franklin, Pa., assignor to Joy Manufacturing Company, Pittsburgh, Pa., a corporation of Pennsylvania
Filed Mar. 30, 1962, Ser. No. 183,905
8 Claims. (Cl. 198—137)

This invention relates to a conveyor and more particularly to a belt-type material conveying apparatus having a substantially horizontal receiving portion and an upwardly inclined discharge portion so that material being conveyed is first transported horizontally at a relatively low level and then elevated to a substantially higher discharge point.

Horizontal conveyors are well known in the art as are elevating or lowering conveyors of the belt type. However, the two functions of horizontal transport and oblique upward or downward transport have commonly been accomplished by the application of two separate conveyors. The conveyor of the present invention provides a device combining these two functions in one relatively simple apparatus. Where overhead clearance is sufficient these two functions of horizontal and oblique conveying can be combined in a single upwardly or downwardly inclined conveyor. Such an inclined conveyor commonly requires a multiplicity of large, relatively expensive, supporting structures. Under other circumstances it has been found possible to combine horizontal conveying and oblique elevating functions in a single conveyor by utilizing the natural curvature of a conveyor belt, which curvature is a resultant of the downward forces exerted by the weight of the belt and the load being conveyed combined with the necessary tension applied to the belt in driving the belt in its orbital motion around the pulleys of the conveyor mechanism. Such natural curvature has a large radius (rarely being less than 100 ft.) and consequently requires a large amount of space or a very long conveyor to be successfully applied.

The present invention provides an elongated material conveying apparatus having a single, orbital, flat belt trained about a low pulley at one end of the apparatus and about a higher pulley at the other end, one of these pulleys is an idler while the other is a drive pulley. Intermediate the two aforementioned pulleys the upper or conveying run of the belt passes under a hold-down idler pulley comprising an inflated barrel shaped member rotatably mounted and formed of thin, rubber impregnated fabric which is characterized by being, non-stretchable and non-porous. This hold-down pulley contacts the load face of the load carrying run of the belt but is readily deformable to allow the passage of any object of regular or irregular shape normally carried by such belt.

Some of the advantages found in the conveyor of this invention are: the ability of this conveyor to accomplish the functions of horizontal transport and oblique upward elevation or descent which have hitherto usually required two separate conveyors with the attendant disadvantages of double expenditures for drive and idler pulleys and a further disadvantage of undesirable reduction in the particle size of easily fractured materials, which normally occurs during transfer from one conveyor to another, with consequent loss of product value; as compared to generally oblique conveyors and those depending upon the natural curve of the belt, the advantages of the conveyor of this invention reside in its less expensive supporting structure and its ready adaptability to different conditions requiring varied lengths of level and inclined runs, respectively; and a further advantage of being useable in vertically restricted spaces where conveyors of prior design could not be used.

The conveyor of the present invention is particularly but not limitatively adaptable to coal mining or other types of mineral extraction where thin seams of mineral result in the production of long low passageways having a height typically of two to three feet so that a conveyor emerging from such passageway would not normally be available to elevate the coal to a sufficient height for it to be deposited in a mine car or shuttle car or other conveyance thus requiring a separate elevating conveyor. With the conveyor of this invention a relatively long horizontal portion of the conveying run of the belt can be followed by a relatively short upwardly inclined portion of such conveying run to deliver the coal over an elevated drive pulley at any desired height.

It is therefore an object of this invention to provide a new and improved belt-type, material conveying apparatus.

It is another object of this invention to provide a new and improved belt-type, material conveying apparatus which can perform the functions of horizontal conveying and oblique upward or downward transporting of material being conveyed.

It is a further object of this invention to provide a new and improved belt-type, material conveying apparatus provided with belt contacting hold-down means separating a conveying run of the belt into a substantially horizontal portion and an obliquely inclined portion to perform horizontal conveying and upward or downward transporting functions within a severely limited space.

It is still another object of this invention to provide a new and improved material conveying apparatus of the belt-type which provides belt hold-down means to divide a conveying run of the conveyor belt into a horizontal portion and an inclined portion, which hold-down means contacts a conveying face of the belt and is readily deformable to allow passage of the material normally carried by such material conveying apparatus.

These and other objects and advantages of this invention will become more readily apparent upon consideration of the following description and drawings in which:

FIG. 1 is a top plan view of a material conveying apparatus constructed according to the principles of this invention;

FIG. 2 is a side elevational view of the apparatus of FIG. 1;

FIG. 3 is an enlarged sectional view taken substantially on the line 3—3 of FIG. 1; and FIG. 4 is a fragmentary side elevational view of a second embodiment of a material conveying apparatus constructed according to the principles of this invention.

In FIG. 2 there is shown a material conveying apparatus generally indicated at 10, constructed according to the principles of this invention and having a substantially horizontal portion 12 and an upwardly inclined portion 14. The apparatus 10 is shown, for purposes of illustration, resting upon a floor surface 16 of a mine having a relatively low passageway 18 produced in the mining of a thin seam of coal, such passageway 18 communicating with a relatively high room or haulageway 20 as is common in coal mining or other mineral extraction operations. The apparatus 10 comprises a conveyor belt generally indicated at 22, trained about, and orbitally driven by, a high drive pulley 26 and a relatively lower idler pulley 24 in a manner well known in the art. The pulleys 24 and 26 can be of any suitable design but ordinarily are generally cylindrical steel pulleys rotatably mounted and provided with means for controlling the horizontal distance therebetween, to provide proper tensioning of the belt 22. The belt 22 has an upper or conveying run and a lower or return run and in the horizontal portion 12 of the apparatus 10 these runs are respectively supported by suitable, laterally spaced, upwardly concave, troughing idlers 28 and cylindrical return idlers 30 rotatably mounted on suitable supports in a manner well known in the art.

The belt 22 is orbitally driven by the drive pulley 26 rotatably powered by a suitable motor 32 through a suitable driving mechanism 34 of gears or pulleys in a manner well known in the art. The drive pulley 26, the motor 32, and the drive mechanism 34 are mounted upon, and supported by, a suitable support structure 36 which rotatably supports the drive pulley 26 at a desired height above the floor surface 16 of the mine.

The return run of the belt 22 is divided into horizontal and inclined portions by a cylindrical hold-down pulley 38 rotatably mounted in a suitable structure suitably anchored to the floor 16. The conveying run of the belt is similarly divided into horizontal and inclined portions by a barrel shaped, fluid inflatable, hold-down member 40 constructed of thin, rubber impregnated, fluid tight, non-stretchable fabric (desirably nylon or the like) and rotatably mounted on a pivotably mounted axle member 42. The hold-down member 40 is provided with a valve 41 to facilitate inflation and deflation of the member 40 by adding or removing a fluid such as air or water. Such hold-down member 40 is similar to and can be identical with, the roller described and shown in U.S. Patent No. Re. 24,272. The axle 42 is so mounted as to be held against horizontal motion but vertically yieldable by being pivotably secured to a pair of elongated, horizontally extending arms 44, pivotally mounted at the apexes of a pair of generally triangular upwardly extending support brackets 46, respectively, suitably secured to and supported by the floor surface 16. The arms 44 have, on their end portions remote from the brackets 46, T-shaped upward extensions 48, respectively, which rotatably support a pair of relatively small diameter elongated cylindrical steel rollers 50, having their axes parallel to the axle 42, and so positioned as to apply a downward force on the hold-down member 40 without substantially interfering with its desired rotation. The hold-down member 40, having an axial length substantially greater than the width of the belt 22, overlappingly rests upon and presses against the upper surface of the load carrying run of the belt 22. The downward force of the member 40 comprises the weight of the hold-down member 40, the rollers 50 and the arms 44 in addition to downward force supplied by a plurality of weights 52 removably mounted on intermediate portions of the arms 44, respectively. Additional downward force can be supplied by filling the member 40 with water or other liquid. It is to be noted that although the weights 52 are shown and described, it is only necessary that the hold-down member 40 be mounted in a downwardly biased, vertically yieldable manner such as by the weights illustrated or by springs or other resilient devices.

In operation of this device, the motor 32 suitably supplied with power from a suitable source (not shown) and acting through the drive mechanism 34 rotates the drive pulley 26 in a clockwise direction as viewed in FIG. 2. Such rotation of the pulley 26 causes the belt 22 to orbit about the tail pulley 24 and the drive pulley 26 with the upper or load carrying run of the belt traveling from left to right as viewed in FIG. 2. The downward force of the hold-down member 40 is suitably adjusted by varying the number of the weights 52 so that the intermediate portion of the belt 22 remains in contact with the troughing idlers 28 at all times whether starting or running, loaded or unloaded, and whether evenly loaded or subjected to sudden heavy loads on one portion of the belt 22. The hold-down member 40 rotates in a counter-clockwise directon and is held down against the belt 22 by the rollers 50, downwardly biased as hereinbefore described.

It is to be noted that with this design the axle 42 merely furnishes an axis of rotation and is not to be considered as furnishing any substantial part of the desired downward force. It is to be further noted, however, that, under circumstances where a small downward force is desired, this apparatus could be constructed without the rollers 50, relying upon the axle 42 and the weight of the member 40 and its fluid contents to provide the desired downward force. The required amount of downward force is determined by many factors, some of which are the load on the belt, the weight of the belt 22 in relation to its stiffness, the height of the discharge pulley 26 in relation to the tail pulley 24, and the angle of rise.

After the downward force has been adjusted as hereinabove described, material to be conveyed, such as coal from a mining operation, is deposited upon the horizontal portion 12 of the apparatus 10 and resting upon the upper surface of the load carrying run is transported horizontally out of the passageway 18 and under the hold-down member 40 whence it is carried up the inclined portion of the apparatus and discharged over the drive pulley 26 into a shuttle car or other conveyance (not shown). The maximum angle of rise for the inclined portion is determined by the angle of repose of the material being conveyed. It is to be noted that, although the downward force required to hold the belt in the desired conformation is of the order of several hundred pounds, the fluid pressure within the hold-down member 40 would be of the order of only three or four pounds per square inch because of the large number of square inches of area in the contact surfaces of the belt and hold-down member 40. With such low pressure and the thin flexible material of which the hold-down member 40 is formed, the member 40 readily deforms to fit the shape of whatever load is being carried by the belt, as illustrated in FIG. 3, and since the member 40 overlaps the sides of the belt 22, spillage is held to a minimum with little, if any, reduction in particle size of the product being conveyed.

It is further to be appreciated that, when the belt 22 is operating unloaded, the barrel shape of the member 40 will help to maintain the desired trough shape of the load carrying run and such barrel shape will also supply a centering force for proper training of the belt as is well known in the art.

In FIG. 4 there is shown a second embodiment of the apparatus of this invention wherein the same numbers are used to designate parts identical with those of the first embodiment (FIGS. 1 and 2). The second embodiment differs from that of FIGS. 1 and 2 in having a plurality of the hold-down members 40 (shown as two) mounted in tandem, along the run of the belt 22, on elongated arms 44' similar to the arms 44 of the first embodiment but provided with double the number of axles 42, T-shaped upward extensions 48 and rollers 50 to apply downward forces to the two hold-down members 40. The members 40 are downwardly biased by the weights 52 or otherwise as in the first embodiment and can be partially or completely filled with water or other liquid to add downward force if necessary. It is to be noted that the second embodiment encompasses the use of a plurality of the hold-down members 40 without the rollers 50 so that downward biasing would be applied by the axles 42 and the weight of the members 40 and their fluid contents.

The second embodiment is of course, designed to be used where more downward force, upon the belt 22, is needed than can be supplied by one of the members 40. The factors upon which the necessary amount of downward force depends, having been hereinabove described no further recitation is needed. Advantages inherent in the second embodiment reside in the smaller change of belt direction occurring under each roller with a consequent reduction of forces applied to the belt at such point and a similar reduction in product breakage and spillage.

A preferred embodiment of this invention having been shown and described it is to be realized that modifications thereof may be made without departing from the broad spirit and scope of this invention. It is therefore respec-

What I claim is:

1. Conveyor apparatus comprising, a support, an endless conveyor belt supported by said support and having an upper surface upon which material to be conveyed is deposited and which surface has adjacent portions movable in a path defining an obtuse angle, a belt hold-down device comprising a readily deformable member supported for rotational movement about an axis extending transversely of said path with a portion of the outer surface thereof engaging said adjacent portions, said hold-down device including means for supporting said deformable member such that the weight of said deformable member urges said deformable member into engagement with said adjacent portions, and said means further supporting said deformable member for yieldable movement away from said adjacent portions.

2. Conveyor apparatus as defined in claim 1 having means rotatably engageable with said deformable member for urging said deformable member towards said adjacent portions.

3. A conveyor as defined in claim 1 having means for varying the force exerted by said deformable member.

4. Conveyor apparatus comprising, a support, an endless conveyor belt supported by said support and having an upper surface upon which material to be conveyed is deposited and which surface has adjacent portions movable in a path defining an obtuse angle, a belt hold-down device comprising a selectably inflatable readily deformable member supported for rotational movement about an axis extending transversely of said path with a portion of the outer surface thereof engaging said adjacent portions, said hold-down device including means for supporting said deformable member such that the weight of said deformable member urges said deformable member into engagement with said adjacent portions, and said means further supporting said deformable member for yieldable movement away from said adjacent portions.

5. Conveyor apparatus comprising, a support, an endless conveyor belt supported by said support and having an upper surface upon which material to be conveyed is deposited and which surface has adjacent portions movable in a path defining an obtuse angle, a belt hold-down device comprising a plurality of readily deformable members supported for rotational movement about an axis extending transversely of said path with portions of the outer surfaces thereof engaging said adjacent portions, said hold-down device including means for supporting said deformable members such that the weight of said deformable members urges said deformable members into engagement with said adjacent portions, and said means further supporting said deformable members for yieldable movement away from said adjacent portions.

6. A conveyor device as defined in claim 5 having means rotatably engageable with said members for urging said members toward said adjacent portions respectively.

7. A belt hold-down apparatus comprising, a first support, a second support extending laterally from and pivotally connected to said first support, a readily deformable member supported by said second support for rotation with respect thereto about an axis parallel to an axis about which said second support pivots with respect to said first support, and said second support having a lateral extension to which rollers are rotatably secured to engage the outer surface of said deformable member.

8. A belt hold-down apparatus comprising, a first support, a second support extending laterally from and pivotally connected to said first support, a plurality of readily deformable members supported by said second support for rotation with respect thereto about axes parallel to an axis about which said second support pivots with respect to said first support, and said second support having a lateral extension to which rollers are rotatably secured to engage the outer surface of said deformable members, respectively.

References Cited in the file of this patent
UNITED STATES PATENTS

| | | |
|---|---|---|
| 2,133,727 | Staude | Oct. 18, 1938 |
| 2,499,212 | Custer | Feb. 28, 1950 |
| 2,809,865 | Earnshaw | Oct. 15, 1957 |